Dec. 21, 1948.  A. GRUENWALD  2,456,697
APPARATUS FOR FORMING GLASS BEADS
AND THE LIKE ARTICLES

Filed March 14, 1944  2 Sheets-Sheet 1

INVENTOR.
ANDREW GRUENWALD
BY
Schaines & Liberman
ATTORNEYS

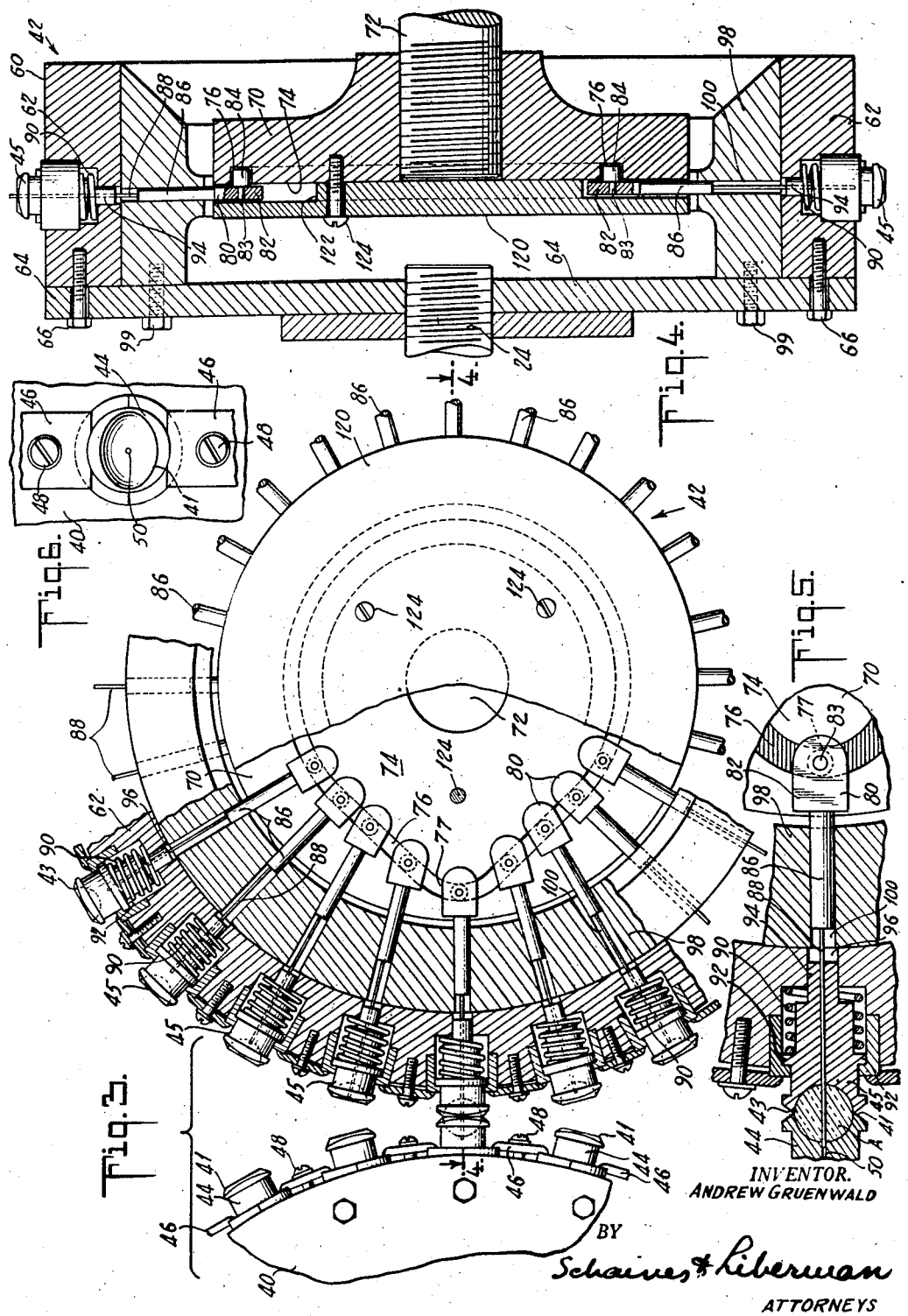

Patented Dec. 21, 1948

2,456,697

UNITED STATES PATENT OFFICE 2,456,697

APPARATUS FOR FORMING GLASS BEADS AND THE LIKE ARTICLES

Andrew Gruenwald, New York, N. Y., assignor to Novelty Jewelry Corporation, New York, N. Y., a corporation of New York Application March 14, 1944, Serial No. 526,428

7 Claims. (Cl. 49—29)

My invention relates to an apparatus for forming beads or the like. As used in the following description of my invention, the term "bead" may mean any solid object, whether apertured or unapertured, of any size or shape, to be used as an ornament, an article of clothing, for industrial purposes or otherwise. I will describe my invention as applied to a method of and apparatus for making beads of glass, but it should be understood that any fluent, setting material, plastic or otherwise, may be used equally well within the scope of my teachings.

The main object of my invention is the provision of an apparatus for continuously forming beads or like objects.

A further object of my invention is the provision of an apparatus for forming an apertured bead or the like.

A further object of my invention is the provision of an apparatus for simultaneously forming and aperturing a bead or the like.

A further object of my invention is the provision of an apparatus for forming apertured beads or the like whereby the bead is apertured at the same time it is being formed.

Still another object of my invention is the provision of a bead-forming apparatus comprising a pair of cooperating die members and an aperturing pin passing through each of the cooperating members.

Still another object of my invention is the provision of an apparatus comprising a pair of cooperating rollers, each having a plurality of opposed forming dies thereon, aperturing means, and means in one of said rollers to actuate the aperturing means to move same through the forming die on said rollers and into the opposing die on the other roller.

Other objects of my invention will be obvious, and still others will be pointed out specifically in connection with the following description of an illustrative embodiment of my invention.

In the drawings annexed hereto, forming a part hereof;

Figure 3 is a relatively enlarged, side, elevational view, partly in section, showing structural details of the roller components of my invention;

Fig. 4 is a section on the line 4—4 of Fig. 3;

Fig. 5 is a cross-sectional view through a pair of cooperating mold members at the point of contact; and Fig. 6 is a plan view of one form of die or mold face which may be used as a part of my apparatus.

Figure 1:
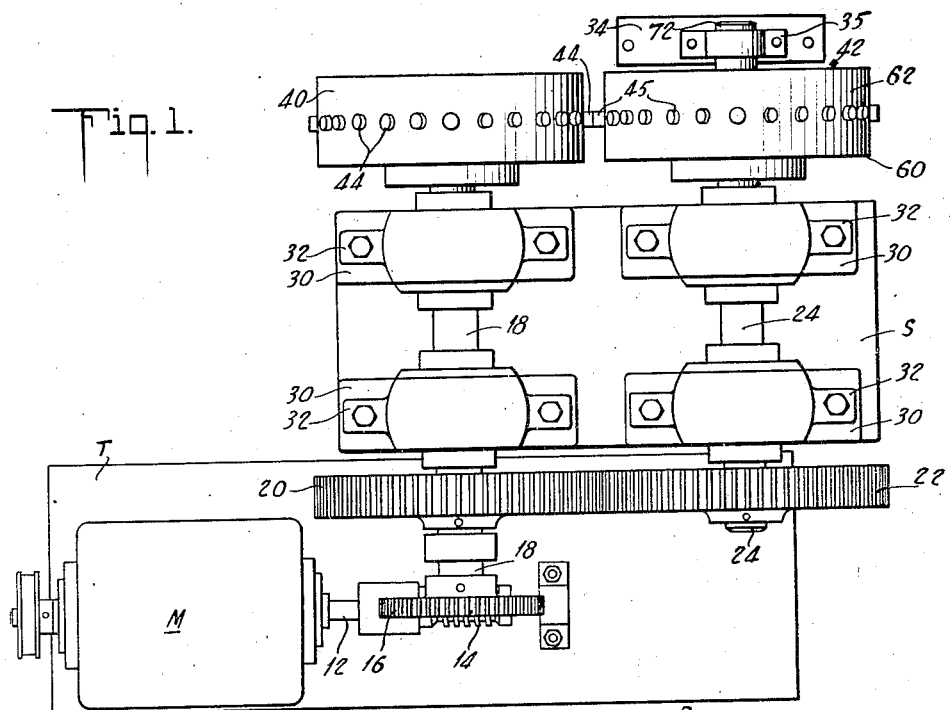
Figure 1 is a top plan view of one form of machine constructed according to and embodying my inventions.

In the drawings, M indicates a motor or gear box, having a rotating shaft 12 projecting therefrom, on which an endless worm gear 14 is mounted, in mesh with a vertically disposed driven gear 16, which is rotated by worm 14, and with it horizontally disposed shaft 18 on which gear 16 is secured. A large spur gear 20 is mounted on shaft 18, for rotation therewith, which spur gear is in mesh with an equally sized driven gear 22 mounted on a horizontally extending shaft 24, aligned with shaft 18.

Motor or gear box, worm gear 14, and shafts 18, 24 may be mounted atop a suitable table T, and shafts 18, 24 extending horizontally and outwardly therefrom, are also mounted atop suitable supports S. The aligned shafts 18, 24 are rigidly secured within pillow blocks 30, 30 and collars 32, 32, and project therebeyond, as will be described below. The terminal end of shaft 18 is secured to a roller 40 for rotating the same therewith, and the terminal portion of the aligned shaft 24 is secured to a cooperating roller or drum 42 for rotation therewith. Roller 40 may consist merely of a solid circular member, with suitable recesses in its periphery to receive die members and the securing and cushioning means therefor, or may be otherwise formed, the desiderata being a structure strong enough to support a plurality of cushioned die members as 44 on its periphery and projecting therefrom.

A plurality of die members 44 are set within suitable sockets or recesses in the periphery of roller 40, and secured thereon by means of plates 46 screw locked to the roller as at 48. Preferably, the die members 44 are of such length as to project radially beyond the surface of roller 40. As seen in Figs. 5 and 6, die members 44, 44 are longitudinally apertured, as at 50. The face of each die member 44, 44 is concavely recessed or otherwise formed, and the perimeter thereof narrowed to a knife edge, as at 41. The size and shape of the die face may be varied in accordance with the size and shape of bead it is desired to produce.

The other and opposing roller 42 is of different construction, my bead aperturing means and the means to actuate the perforating devices being disposed therewithin. Thus, roller 42, as a unit, comprises a hollow drum as 60 which may be built up of an annual outer ring 62 and a side wall plate 64 secured thereto as by means of threaded bolts 66, or roller 42 may comprise a single piece consisting of an annular ring and side wall. The terminal end of shaft 24 is rigidly secured to plate 64, and as shaft 24 is rotated, drum or roller 42 is rotated along with it. Within the recess in drum 60, I dispose a disc 70 secured to a shaft 72, the terminal end of which is fixed against rotation on support 34 by clamp collar 35. Thus, as drum or roller 60 rotates, disc 70 remains fixed with respect thereto. On the inner face 74 of disc 70, I form an eccentric groove or trackway 76, which is generally circular all about the disc except opposite the point where the rollers oppose each other, at which point the track is attenuated almost to a point, as at 77. This generally egg-shaped trackway is a major factor in the particular means and method I employ to form the apertured objects of my invention.

A plurality of dogs, 80, 80 are provided, equal in number to the number of die members, each dog 80 comprising a block 82, and having a pin 83 extending outwardly therefrom on which is mounted a roller 84 fitting into trackway 76. A shaft 86 is secured to each dog 80 in line therewith, to which shaft is attached a rod or elongated perforating pin 88 which is slidably received within its aligned die members 45 mounted on roller 42. Block 82 forming the butt end of the perforating pin assembly, shaft 86 and pin 88 may be formed as one piece, as desired.

The periphery of the outer annular ring 62 has a plurality of recesses therewithin extending therethrough, each to receive a die member 45. Each die has a coil spring 90 surrounding the body of the die, the spring being trapped within the recess between a collar 92 on the die and the bottom of the recess and normally urging the die outwardly. The dies are held in place as by plates 46, secured to the rollers as by screw bolts 48, see Figure 6.

While I have shown only the die members 45 resiliently mounted to project out from the surface of roller 42, die members 44 on the opposing roller 40 may also be so mounted. Thus, when the rollers, rotating in opposite directions, bring a pair of dies 44, 45 into opposing relation, pressure of the material A and of the abutting dies will be passed down the die members and absorbed by springs 90, which permit the dies to slide inwardly under the influence of the material being molded and of the pressure of the opposed die. The edge of each die 45 is also reduced to a knife edge, as at 43.

As shown in Figs. 1 and 4, rollers 40, 42 have a single row of die members 44, 45 set thereinto and projecting out therefrom. Obviously, of course, and within the scope of my invention a plurality of rows of die members may be set into each roller, limited only by the fact that each opposed pair of dies must be matched for a particular purpose or device.

Plates 46, and screw bolts 48, may similarly be employed on roller 42 as on roller 40, to keep the dies 45 in position. Each die 45 has a reduced extension 94 at the bottom thereof which fits into a reduced portion 96 of the openings through the annular ring, the fit serving also to align the die properly on the ring. A second annular ring 98 is disposed within the drum, of sufficient size to fit snugly against ring 62. Ring 98 is also secured to plate 64, as by screw bolts 99, so that it rotates along with ring 62 and shaft 24. As shown in Fig. 3, I provide a perforating pin 88 for each die 45, and the shaft 86 and pin secured to each dog 80 fits slidably within apertures 100, 100 through inner ring 98, alined with the apertures 96 through the outer ring 62. Each die 45 is also longitudinally apertured to permit perforating pin 88 to reciprocate therethrough. As seen in Fig 3, when the dog 80 is at the circular portion of trackway 76, pin 88 projects up into the body of die 45, short of the mold face portion thereof. As the dies 45 are borne around by the rotation of roller 42, the dog 80, shaft 86, pin 88, die 45 assembly is carried with it. Dog 80 is held to the path of trackway 76 by roller 84, and of necessity follows the direction of the track, and is held within the path by a plate 120. As the dog is drawn away from the circle and towards the attenutated portion 77, it is drawn towards the periphery of roller 42, the tip of pin 88 advancing upwardly through hole 50 of its die, until it meets the opposed die 44, opposite which point trackway 77 reaches closest towards the periphery of the roller, leading dog 80 close to the periphery and causing pin 88 to extend through die 45 and into die 44 through the mold face thereof. As rollers 40 and 42 continue their rotation, the dogs are borne away from the surface of roller 42, carrying pins 88, 88 back down through dies 45, 45 to below the surface of the mold faces of the dies.

A circular plate 120 is provided, having an annular notch 122 on one side thereof, at the periphery thereof which is secured over the face 74 of disc 70 to hold dogs 80 and shafts 86 in place in trackway 76, the notch 122 being deep enough to permit ready movement of dogs 80, 80, while preventing them from twisting.

Figure 2:
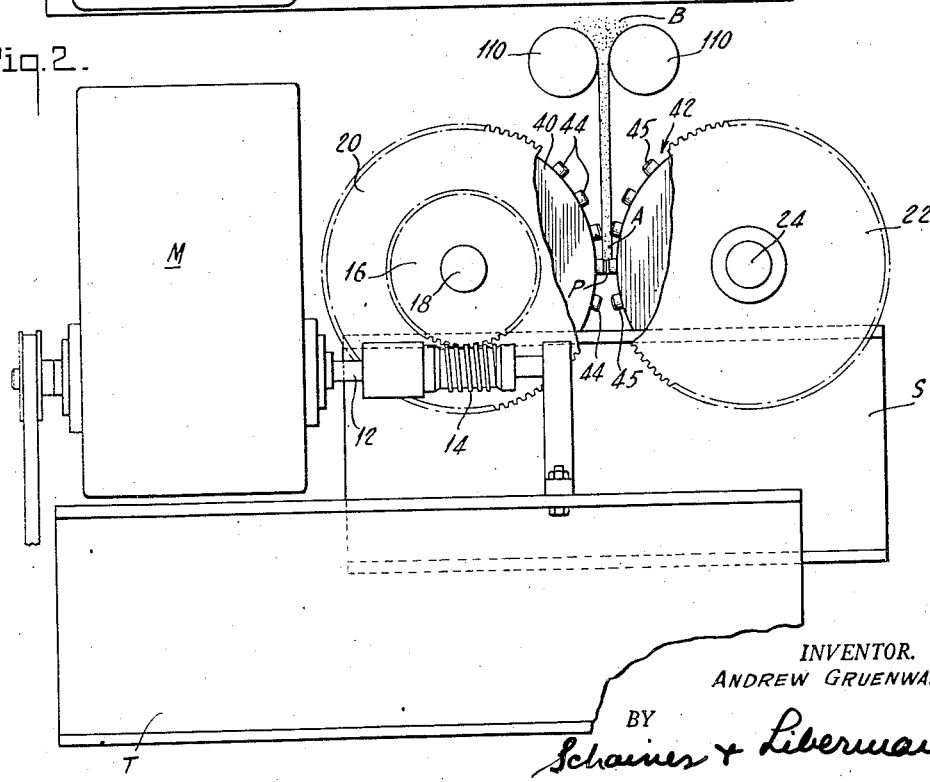
Figure 2 is a side elevational view thereof, partly broken away.

The operation of my apparatus is as follows: Referring to Fig. 2, I have shown a mass B of fluent material, as molten glass, flowing down from between a pair of opposed pressure rollers 110, 110, between which the mass is reduced to proper thickness. The stream A is directed between the opposing rollers 40, 42. The gears 20, 22 are so adjusted in respect of the positioning of dies 44, 45 on the rollers, that each die member 44 of one roller 40 is directly opposed to a die member 45 of roller 42 when the rollers pass a common point as P. As the point of contact is approached, the dogs are gradually drawn up towards the periphery of the outer ring, pushing rods or pins 88 up through the longitudinal aperature in each die 45. As each die 45 proximates and opposes its oppositely disposed die 44, the dog 80 is drawn or tracked to its extreme point of nearness to the periphery, pushing pin or rod 88 up and through die 45 and into the opposing die 44 on the other roller. The batch of fluent material A cut off from the mass between the opposing die members by the knife edges 41, 43, is formed into an object of the desired size and shape, of which the depth and form of the dies 44, 45 are determining factors, and simultaneously is apertured at the very moment it is being formed.

As the point of proximation P is passed, the dogs 80, 80, following the trackway, retract the pins 88 down through the die members 45 permitting the apertured object to drop down into a suitable receptacle disposed beneath the rollers, from which the molded objects may be removed for further handling, as polishing or the like.

The projection of the die members radially beyond the roller surfaces is an important factor in my method and apparatus, since it prevents contact of the fluent material with the rollers and thus prevents premature chilling or hardening of the material being molded. With glass, and with other materials, a certain temperature must be maintained to insure proper flow, and the projecting dies and the knife edges of the dies will cooperate in reducing to a minimum contact between the forming devices and the fluent material and insure maintenance of optimum conditions.

Having described my invention, what I claim and desire to secure by Letters Patent is:

1. A device of the character described comprising a support having thereon a pair of oppositely positioned continuously rotating roller members, a plurality of axially apertured die members on the periphery of each roller and projecting outwardly therefrom and movable along therewith, the rollers being so disposed on the support as to bring successively the dies on one roller into aligned and abutting relation to the dies on the other roller during their rotation, aperturing means in one roller and means to gradually move the aperturing means through one set of dies and then into the dies of the opposing set on the other roller as and when the pairs of opposed dies are brought into aligned and abutting relation.

2. A device of the character described comprising a pair of opposed rollers, means to rotate same simultaneously in opposite directions, a plurality of axially apertured die members on each roller and movable therewith, means to synchronize the rotation of the rollers to successively bring a die on one roller into axial alignment and contacting relation to a die on the other roller, perforating means in one roller normally disposed below the die surface, and means to progressively advance said perforating means to extend same through both die members at the point of contact therebetween.

3. A device of the character described comprising a pair of opposed rollers, means to rotate same simultaneously in opposite directions, a plurality of axially apertured die members on each movable therewith, means to synchronize the rotation of the rollers to successively bring a die of one roller into axial alignment with and contacting relation to a die of the other roller, a perforating device in one roller for each die member thereon, each perforating device normally disposed below the level of its die, and means to progressively advance each perforating device to extend same through each die and into its opposing die at the point of contact therebetween.

4. A device of the character described comprising a pair of opposed rollers, means to rotate same simultaneously in opposite directions, a plurality of axially apertured die members on each roller movable therewith, means to synchronize the rotation of the rollers to bring a die of one roller into axial alignment with and contacting relation to a die on the other roller, a perforator for each pair of aligned die members, said perforator being normally disposed below the die level, and means to progressively advance said perforators to extend same through both die members at the point of alignment and contact therebetween.

5. A device as in claim 4, in which the perforators are all disposed within one of the rollers, and the advancing and extending means are disposed within the same roller.

6. A device as in claim 4, in which the perforators are supported within one roller and carried along with it during its rotation.

7. A device of the character described comprising a pair of opposed rollers, means to rotate same simultaneously in opposite directions, one of said rollers being hollow and having a disc disposed therewithin fixed against rotation with respect to said roller, a plurality of axially apertured die members mounted on the hollow roller and carried along therewith, a plurality of elongated, perforating rods disposed within said hollow roller and carried along therewith, each rod having a perforating tip and butt end, a trackway in said disc, the butt ends of the elongated rods being slidably disposed within said disc trackway, rotation of the hollow roller about the fixed disc causing radially reciprocating movement of each of the elongated rods through its associated member, the perforating tip of each of the rods projecting outwardly and radially beyond its die at the point of closest proximity to the other roller.

ANDREW GRUENWALD.

REFERENCES CITED

The following references are of record in the file of this patent:

UNITED STATES PATENTS

| Number | Name | Date |
|---|---|---|
| 989,831 | Burkhardt | Apr. 18, 1911 |
| 1,493,044 | Leiman | May 6, 1924 |
| 1,537,348 | Grossmann | May 12, 1925 |
| 2,359,798 | Schumann | Oct. 10, 1944 |

FOREIGN PATENTS

| Number | Country | Date |
|---|---|---|
| 14,107 | Great Britain | 1886 |
| 188,463 | Great Britain | Nov. 16, 1922 |
| 484,280 | Germany | Oct. 12, 1929 |